United States Patent
Felsl (10) Patent No.: US 10,607,274 B2
(45) Date of Patent: Mar. 31, 2020

(54) GOODS SYSTEM AND METHOD FOR A GOODS SYSTEM

(71) Applicant: B-Labs AG, Biel (CH)

(72) Inventor: Andreas Felsl, Biel (CH)

(73) Assignee: Horage S.A., Biel (CH)

(*) Notice: Subject to any disclaimer, the term of this patent is extended or adjusted under 35 U.S.C. 154(b) by 553 days.

(21) Appl. No.: 14/423,591

(22) PCT Filed: Aug. 26, 2013

(86) PCT No.: PCT/EP2013/067652
§ 371 (c)(1),
(2) Date: May 26, 2015

(87) PCT Pub. No.: WO2014/029893
PCT Pub. Date: Feb. 27, 2014

(65) Prior Publication Data
US 2015/0269650 A1 Sep. 24, 2015

(30) Foreign Application Priority Data

Aug. 24, 2012 (DE) .......... 10 2012 107 841
Aug. 28, 2012 (DE) .......... 10 2012 107 929

(51) Int. Cl.
| | |
|---|---|
| G06Q 30/00 | (2012.01) |
| G06Q 30/06 | (2012.01) |
| G06F 16/955 | (2019.01) |
| G06Q 30/02 | (2012.01) |

(52) U.S. Cl.
CPC ..... *G06Q 30/0633* (2013.01); *G06F 16/9554* (2019.01); *G06Q 30/00* (2013.01); *G06Q 30/0267* (2013.01)

(58) Field of Classification Search
CPC ..... G06Q 30/0601–0645; G06Q 30/08; G06Q 30/00; G06Q 30/0267; G06F 16/9554

USPC .............................. 705/26.1–27.2
See application file for complete search history.

(56) References Cited

U.S. PATENT DOCUMENTS

| | | | | |
|---|---|---|---|---|
| 2002/0072974 | A1* | 6/2002 | Pugliese, III | .......... G06Q 30/02 705/14.16 |
| 2012/0271712 | A1* | 10/2012 | Katzin | .......... G06Q 30/06 705/14.51 |
| 2013/0193200 | A1* | 8/2013 | O'Connor | .......... G06Q 30/0241 235/375 |

FOREIGN PATENT DOCUMENTS

WO 2009/079407 6/2009

OTHER PUBLICATIONS

SBS Technological Disruption and Innovation in Last-Mile Delivery—White Paper; Stanford Business School, Stanford University: Stanford, CA, USA, 2016. (Year: 2016).*

* cited by examiner

Primary Examiner — Jason B Dunham
Assistant Examiner — Anand R Loharikar
(74) Attorney, Agent, or Firm — Boyle Fredrickson S.C.

(57) ABSTRACT

The invention relates to a goods system having goods, in particular in accordance with the invention, wherein each good has an individual code. The code is stored in a database and linked to information, in particular information relevant to sales. The code of the good is designed in such a way that the code can be scanned in by means of a scanner of a device, in particular of a smart phone. The information linked to the code in the database can be displayed on the device. Furthermore, the good provided with the code can be purchased by means of the device by using the code.

11 Claims, 6 Drawing Sheets

GOODS SYSTEM AND METHOD FOR A GOODS SYSTEM

BACKGROUND OF THE INVENTION

Field of the Invention

The invention relates to a goods system and a method for a goods system. Further a circulation system comprising a circulation of a print product is concerned.

Description of Related Art

It is known from prior art to sell goods, for example bicycles, to customers through a dealer. Those goods are manufactured in a factory and sold by a branded company usually through an importer to a dealer who in turn sells the goods to customers. It is a drawback in this case that the products are comparatively expensive due to the long trade chain. It is further a drawback that such dealer has a comparatively small range of goods. The branded company is a bicycle manufacturer, for example. By way of example, the latter offers a range of six bicycle models in two colors, in four sizes and three types of equipment, whereby 144 variants can be provided. Due to its limited storage space and potential circle of customers, the dealer offers only 15 bicycles out of this range in respective different variants and thus only a fraction of the possible variants. It would be more advantageous when the dealer could offer all variants and thus a total range of goods (full range).

Moreover it is known from prior art to sell goods via the Internet through an online dealer to customers. These online dealers usually offer a wide range and are able to centrally offer the same. Hence the costs for the goods are lower, thereby a sales price of the goods being reduced. It is a drawback in this case that a potential customer cannot physically inspect the goods of the online dealer, but can only have a virtual look at them. Hence a "look and feel" test, as it is called, of a product is not possible. As a result, a large part of the goods sold is returned by the customer, which incurs costs.

Furthermore, it is known from prior art to promote goods by advertisements via a circulation system, for example through a daily newspaper. A potential customer is intended to be induced to acquire the promoted goods from a conventional dealer or an online dealer or from a direct distributor. It is a drawback that the incentive for sale through the advertisements is comparatively low.

SUMMARY OF THE INVENTION

On the other hand, the object underlying the invention is to provide a method for a goods system, a goods system and a circulation system which are inexpensive and eliminate the aforementioned drawbacks.

The object is achieved as regards the method for a goods system by the features of claim 1, as regards the goods system by the features of claim 10, as regards a circulation system by the features of claim 12 and as regards a distribution system by the features of claim 15.

In accordance with the invention, a method for a goods system comprises the following steps of:

Providing goods or a group of goods with an individual and unambiguous code by an enterprise, especially an enterprise of origin, especially a manufacturer of the goods or group of goods and/or a branded company. The code is, for example, a QR code, a barcode or an RFID code. The goods or group of goods are individualized by the code, whereby a particular product having a separate code only matching this product or this group of goods. The code is linked with sales-relevant information of the product via a database or is linked with the database after the goods or group of goods have been provided with the code. As sales-relevant information especially a price of the goods and/or a current location of the goods is/are provided. Alternatively, the code can be linked with other or additional information of the goods.

In the next step the individualized goods are made available at an agent or a storage location, whereby the goods are delivered to the latter. The agent is a dealer or retailer, for example. Interested customers then can inspect the goods at the agent and/or via Internet. Alternatively, the goods or the group of goods can be made available at a storage location and then can be inspected by the interested customer via Internet or else on site. If a customer is interested in the provided goods, he/she can scan the individual code of the goods (on site) via a device connectable to the Internet, especially via a web-enabled device including a scanner (camera), such as a smart phone or a tablet, and in the next step the code can be compared to the database by the device via the Internet. Alternatively or additionally, the customer can find the goods or the group of goods of the agent or of the storage location by the device via the Internet, for example on the website of the branded company.

After comparing or finding, the sales-relevant information of the goods linked with the code can be made available on the device especially via the Internet. For example, the price and/or the location of the individual product can be shown.

If the interested customer continues to be interested in the product, he/she can buy the same from the branded company through the device, especially online, or through other channels.

This solution offers the advantage that by using the device a customer scans the product at the agent, can immediately pay the same and possibly can immediately take it home. Consequently, the device replaces the entire business infrastructure of the agent. For this, it is necessary that the product is individualized; therefore an entire life cycle of the product is "hidden" behind the code. The enterprise of origin then can access the customer of the goods and can easily determine the prices worldwide.

If the customer finds and/or looks for the goods via the Internet, his/her device can display, for example, where the individual product or a product having an equal variant is located. He/she can collect the individual product after purchase from the agent or the storage location or can have it sent home. If several or plural agents and storage locations are provided in the vicinity of the customer, it is very probable that the customer has access to an entire range of goods or to the majority of the range of goods (for example to the afore-mentioned 144 variants of a bicycle) so-to-speak "on site". Although the customer finds the product through the Internet, he/she is guided to a local retailer, for example, who offers the individual product. Thus the customer is "brought to the local dealer" where it is rather probable that he/she will do additional shopping. Moreover the agents advantageously can be found more easily by the customer, which might increase their customer circles.

Consequently, the goods system is a simplified sales process among three or two parties involved in the market. The exchange of required sales-relevant information is carried out via the Internet.

If the customer interrogates the code online, it is imaginable that he/she is additionally enabled to get personal advice, especially live advice or remote advice for the goods by a consultant. This can e.g. be done by telephone, by video conference and/or a "chat". Since the product is individualized, the consultant knows, for example, where the product is located and which individual characteristics the product exhibits.

It is moreover advantageous that the enterprise of origin has a lot of information about the goods so that it knows, for instance, which goods including which components were bought where, by whom and when. Hence especially possible recalls can be carried out in an extremely inexpensive and simple manner by informing specifically the customers having bought the "defective" goods.

The code thus is not the code known from prior art for a product which is part of a bundle of goods, but is an individual code given to an especially completely configured product.

The web-enabled device, especially the smart phone or tablet, includes individual or plural applications for scanning the code, for comparing the code via the Internet and for providing the sales-relevant information linked to the code, or it can perform one or more of these steps via an Internet browser. By the device the customer has his/her own "cash scanner" and everywhere has access to the agent and to the database of the branded company, respectively.

The method for the goods system according to the invention thus is sort of a mixed form between conventional trade, online trade and a direct distributor. The sales process is handled online in the method according to the invention; therefore the agent requires no more business infrastructure, as already afore-described. The agent merely has to make available a storage location for the goods, which is why the costs incurred to the agent are extremely low. By the method according to the invention moreover the benefits of conventional trade can be further used, such as inspection of the goods by the customer on site. In this way bad buys are largely avoided, which equally results in cost reduction for the customer and for the retailer. A long trade chain is avoided by the method according to the invention, as the goods provided with the code can be delivered from the enterprise of origin directly to the agent. If the agent sells a product, for example, a new product can be automatically sent to the agent. Hence it is merely necessary to physically transfer the goods.

Accounting and/or information technology and/or marketing and/or purchase and/or market research can be carried out centrally and thus cost-effectively by the branded company.

Furthermore, it is of advantage to the branded company that the latter is informed about the sold and non-sold goods and the location thereof via the database (real time sales data) and that it can manufacture new goods depending on this information. This also results in smaller stocks and thus low storage costs. Consequently, the branded company can manufacture in a way to suit market needs. In addition, the branded company can quickly react to market variations such as high demand for a specific product in a particular region.

Since a particular product is individualized and the information of the product can be recalled online, a "pirate copy" of this product is advantageously excluded.

In a further configuration of the method the price of the goods can be dynamically adapted by the enterprise of origin or branded company. It is imaginable, for example, that the price varies depending on the storage location of the goods or that the price is identical all over Europe. Hence the prices are no longer fixed by the agents or retailers, but the prices are controlled centrally by the branded company. The customer thus no longer has to search for the cheapest offer. Further, the prices of the goods remain stable. The customer can buy the goods e.g. either online or from the retailer and in each case is granted the same price.

In contrast to conventional trade or online trade, the owner of the goods in the method according to the invention advantageously is always the enterprise of origin or the branded company. Thus the latter is entitled to pricing. Due to the high efficiency of the method according to the invention, this right to price fixing leads to competitive prices which are extremely "fair" both for the customers and for the parties involved in the sale of the goods. Due to this ownership structure, no antitrust problems will arise, either.

When a buyer buys the product, it may be provided that a commission is automatically calculated for the agent. Advantageously, in the database for a particular code a commissioning model is deposited for an agent who holds or has sold the product including the particular code.

It is extremely beneficial that when the goods change their location, this is entered in the database, causing potential customers looking for the goods on the Internet, for example, to know where the goods are stored in their vicinity. Furthermore, the branded company can adapt a price to the location, for example, by the knowledge of the location.

Further it is of advantage that a sale of the goods is recorded in the database.

As an online shop system advantageously a modified standard shop system, especially a Magento shop system, is employed in a cost-effective manner. In this online shop system, in addition to the standard shop system, personal and customer base data can be provided with additional roles (retailer, agent, importer). In addition or alternatively, product base data may exhibit an unambiguous and individual code.

The shop system is browser-based, for example, or is configured as an application of the device or smart phone.

In accordance with the invention, a goods system or a brand cloud, respectively, includes goods or a group of goods, with a particular product or a particular group of goods being provided with an individual code adapted to be scanned. The particular product thus can be or is unambiguously marked. The code especially is a QR code, a barcode or an RFID code. The code is deposited in a digital database of an enterprise marketing the goods, especially a branded company or enterprise of origin. Then the code is linked with sales-relevant information or several pieces of sales-relevant information such as the current price of the goods and the current location of the goods. The individual code of the goods preferably is configured to be adapted to be scanned via a scanner (camera), especially of an Internet-compatible device, especially a smart phone. Moreover the database is configured to be accessible via Internet by the smart phone or another Internet-compatible device especially comprising a scanner. In the case of access of the device via the database at least the sales-relevant information and/or the location of the goods including the code can be transmitted online. Furthermore, in the goods system the goods including the code can be bought via the device (smart phone).

The goods system thus includes especially a database and a particular logic and is accessible especially via browser. Orders and/or payments and/or placements of goods (especially through agents) to customers can be carried out via the goods system. The goods system can administer the type of goods and/or the individual price of the goods and/or the current location of the individual goods and/or the customer buying the individual goods or being interested in the same.

It is further imaginable to access the database by the web-enabled device, for example the smart phone via the Internet so as to display goods on the device (smart phone) depending on their storage location. Thus a potential customer of the goods has the opportunity to find out where the goods can be acquired.

The purchase via the device (smart phone) and/or via the Internet can be accomplished preferably via each instrument of payment, for example card, especially credit card, through PayPal, via cash in advance and/or via RFID payment. Also cash payment is possible, wherein the receiver of the cash payment is bound by contract to transmit the same completely or on a pro rata basis to the branded company.

The goods or group of goods can be transmitted by the branded company to agents and/or to national (central) partners such as distributors and/or to local partners and can be stored there.

The local partner is either a revenue-dependent partner or a commission-dependent partner.

The revenue-dependent partner preferably has a developed shop infrastructure and/or an established store (e.g. medium-sized or large dealers) and/or can make major investments in a storage location, whereas the commission-dependent partner preferably is a small dealer or, for example in the case of the goods of "bicycles", an "ambitioned amateur biker".

The revenue-dependent partners preferably have a share in the revenues (as a "typical dealer"). They may purchase product options, with costs for a respective product option being especially the costs of the particular goods (manufacturing costs, customs fees, transportation fees (handling fees) and turnover tax, where appropriate). Upon purchasing a product option, they receive an individualized product in turn. It is imaginable that costs for discounts and promotion actions are split between the branded company and the revenue-dependent partner. It is further imaginable that in the case of "sale by third party", i.e. sale of their goods or product option, especially online, by another local partner or national partner or the branded company, the revenue-dependent partner receives proceeds from capital. It is moreover possible that the revenue-dependent partner always is entitled to goods in the case of bankruptcy. It may also be provided, for example, that the revenue-dependent partner can offer discount in the form of a voucher up to a particular lower limit to an interested customer.

The commission-dependent partners can be partners being entitled to commission, when they sell an individual product at a discount, for example approx. 30%, of the sales price. Then their possible commission amounts to 10% of the sales price, for example. It is possible that the commission-dependent partner alternatively only deposits a security to be able to store and sell, resp., a product. Furthermore, it is imaginable that, in contrast to the revenue-dependent partner, the commission-dependent partner is allowed to offer defined goods gifts as additional service when the goods are purchased by a customer.

In a goods supply chain between the revenue-dependent partner and/or the commission-dependent partner and the branded company the national partner may be provided. This is advantageous as the national partner usually is very familiar with the national and/or regional market. If a customer buys goods from the revenue-dependent partner, the latter receives the costs for the product option and a share in the sales price less the costs for the product option. The national partner and the branded company equally receive a share in the sales price less the costs for the product option. For example, each of the branded company and the revenue-dependent partner has a share of approx. 42% and the national partner has a share of approx. 16%. The share for the revenue-dependent partners together with their costs paid for the product option will be paid to them by the branded company. The national partners equally receive their shares from the branded company. It is of advantage when the national partners do not "purchase" the individualized goods from the branded company but merely distribute them to the revenue-dependent partners and/or the commission-dependent partners, thereby having to consume less time for accounting etc. and being able to invest more time in trading. Thus they also have extremely low capital requirements. Since the branded company preferably is the owner of the goods until the goods are purchased by a customer, the other partners cannot be affected by any price fixings which are difficult in terms of antitrust and are detrimental to the customer.

Since the revenue-dependent partners and/or the commission-dependent partners acquire a product option and/or the goods from the branded company, "crowd sourcing" is performed for the branded company, whereby it has sufficient assets.

For a plurality of partners the probability of total sale of their respective range of goods is high.

In accordance with the invention, a circulation system including a circulation of a print product is provided. The print product can be a periodically published magazine of up-to-date and/or universal content. It would also be imaginable to provide as a print product an online magazine which can be displayed via tablet PC or browser. The circulation includes a plurality of produced units of the print product. Thus a particular number of produced units of the print product are provided. At least one page of a respective unit of the print product of the circulation is provided with an individual code or circulation code adapted to be scanned by a smart phone or web-enabled device comprising a scanner. Each such page thus has an individual circulation code. For example, it can be determined by way of the circulation code which unit is concerned, where and when it was produced and which side is concerned. The at least one side including the circulation code advantageously includes an advertisement of at least one product and/or one service. The circulation code then can be deposited in a database in which it is linked, for example, with sales-relevant information of the product and/or the service of the advertisement and/or in which it is linked with information about its origin (e.g. that it is depicted on a particular page of a particular magazine) and/or with an article of a bundle of goods. The database can be accessed online by a smart phone. The goods or service linked with the circulation code then can be bought online by a customer via smart phone, especially from the branded company.

The circulation system thus also is a system of goods, wherein a circulation is provided as goods which entails further advantageous effects. If the circulation code is linked with information about its origin and with the article of the bundle of goods, the customer accessing the database can be guided to goods, especially of the goods system, including an individualized code (for example via the home page of a branded company). When the customer buys the product having the individualized code, the information of the circulation code can be taken into account and the customer can get a discount, for example. The purchased product can then be collected from a partner of the branded company or from the branded company or can be sent to the customer.

Advantageously, a marketing system comprising the circulation system according to the invention and comprising the goods system according to the invention is provided. The circulation system and the goods system then can be matched. For instance, scanning the circulation code may lead to the website of a branded company from where an individualized product can be purchased. During purchase the circulation code can be taken into account and, on the one hand, make available information to the branded company, for example from which circulation system the circulation code originates, and, on the other hand, can lead to a discount granted for a purchase price for the customer.

It is imaginable that after buying the goods or service linked with the code said code or the circulation code is devaluated. Hence such circulation code can be used only once. This offers the advantage that, for example, when using such circulation code in a daily paper only one person can use a circulation code for buying the goods or service via a unit of the daily paper. Thus the inducement to buy a print product is increased, as only in a new print product it is ensured for the customer that active circulation codes are provided there.

Furthermore, a price of the goods acquired with the circulation code can be dependent on time. It is possible that a discount granted on the price of the goods is decreasing with time. This increases the inducement for the buyer to acquire the goods and/or service as quickly as possible.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Hereinafter preferred embodiments of the invention are illustrated in detail by way of schematic drawings, in which.

DETAILED DESCRIPTION OF THE DRAWINGS

Figure 1:
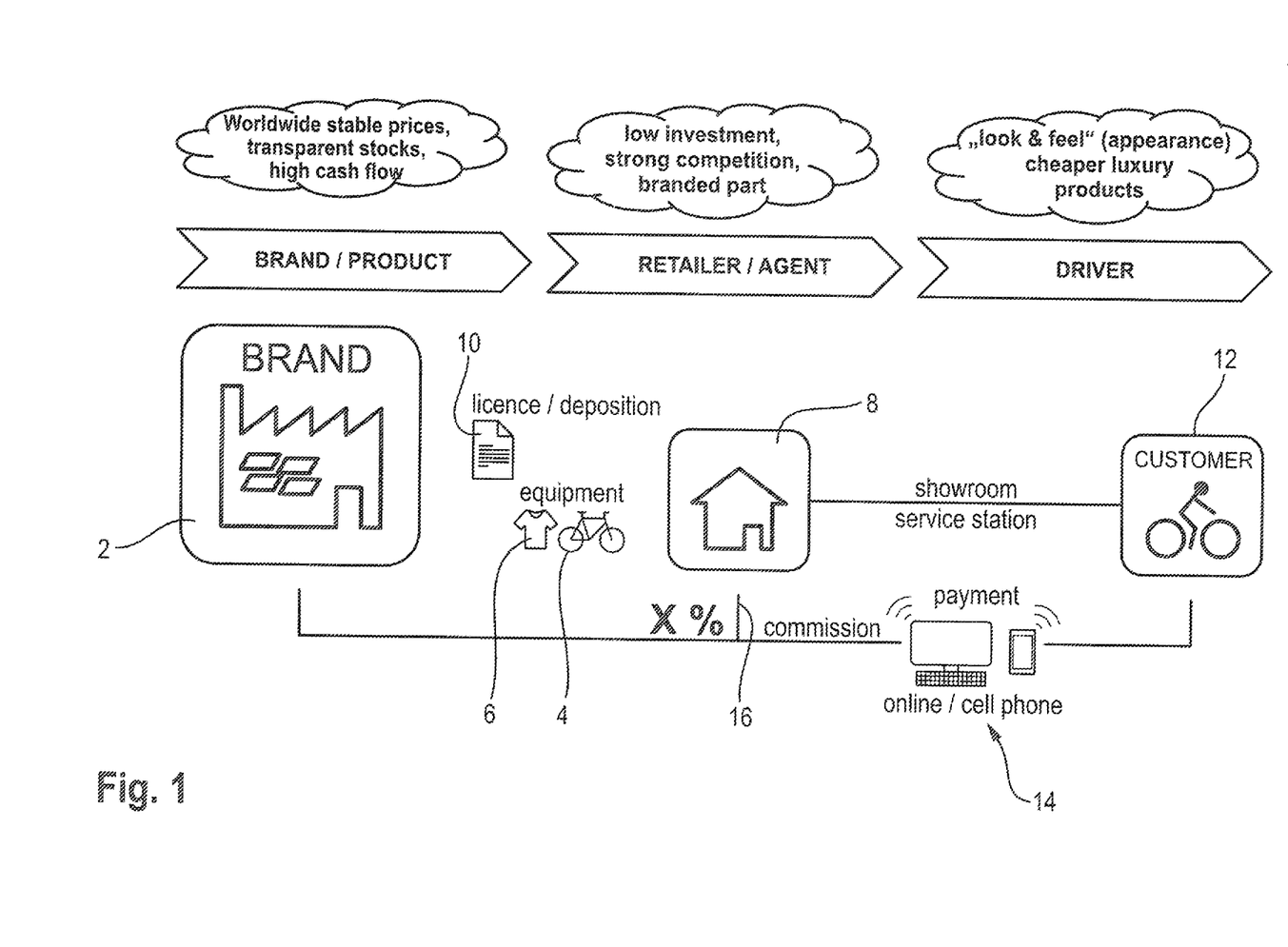
FIG. 1 schematically shows a goods system according to an embodiment.

According to FIG. 1, a goods system 1 is schematically shown. It includes an enterprise of origin 2 being a manufacturer of goods, for example, which are distributed under a particular brand, which renders the enterprise of origin 2 a branded company 2. The latter is e.g. a manufacturer of bicycles 4 and bicycle accessories 6. The individual goods 4, 6 are provided with an individual code, which is especially a QR code, by the branded company 2. The code in this case is linked in a digital database with sales-relevant information of the goods 4 and 6, such as a current price, a current location or information about characteristics of the goods 4 and 6.

After manufacturing and providing the goods 4 and 6 with the code, they are supplied to an agent 8 or retailer. The latter is contractually related to the branded company 2 through a license 10. The agent 8 makes the goods 4 and 6 available to a customer 12, especially by a showroom. A customer 12 then can inspect the goods 4 and 6 on site and can scan the code via a web-enabled device 14 including a scanner. The device 14 especially is a smart phone or a web-enabled computer of the customer 12 or the agent 8. If the customer 12 is interested, e.g., in a particular bicycle 4, he/she can scan the code thereof via the device 14 and can online access the database in which the code is linked with the a.m. information. The customer 12 then is provided online with a price of the bicycle 4, for example, and further information, e.g. about characteristics of the bicycle 4. The price of the goods 4 and 6 can be fixed at will by the branded company 2 and can be dependent on time and/or location, for instance. Apart from the retrieval of information, the customers can additionally or alternatively buy online the goods 4 or 6 the code of which they have scanned. Then this purchase is preferably handled via a standard shop system which is browser-based or is provided on their device 14 with the aid of an application. The purchase then is conducted via the shop system in the usual manner, with the agent 8 receiving a commission 16.

Since the current location of the goods 4 and 6 is currently linked with the individual code of the goods 4 and 6 in the database, the branded company at any time has a survey on the locations of the goods 4 and 6 and can centrally control and tailor the price to the market as owner of the goods, thereby on the one hand the customers being granted a fair price due to the efficient and cost-effective system and, on the other hand, antitrust problems being avoided.

By the goods system 1 a customer 12 can directly buy the goods 4 and 6 online or inspect the same before at an agent 8 and subsequently buy the individual goods 4 and 6 easily online and e.g. directly take them home.

Since the branded company 2 determines the prices of the goods 4 and 6, it is possible, for example, to provide one single price for a particular product 4 and 6. Moreover, the goods 4 and 6 are sold directly by the branded company 2, therefore e.g. costs for middlemen are dropped. Hence merely an agent 8 is required for making the goods 4 and 6 available to a customer.

Marketing campaigns can be made by the goods system 1 worldwide or at selective locations.

Furthermore new product launches are extremely easy.

The agents 8 take small financial risks by the goods system 1, as they do not buy the goods 4 and 6. Furthermore substantially no business infrastructure is required for the agents 8 by conducting the purchase of the goods 4 and 6 online via the branded company 2; therefore entry thresholds and investment costs for new agents 8 are extremely low. The agents 8 can be an integrated part of the branded company 2. It would be imaginable that the agents 8 receive an additional commission in the case of a mere online purchase in their region. Discount campaigns for the goods 4 and 6 can be paid and controlled by the branded company 2. Since the branded company 2 fully controls the price of the goods 4 and 6, it can prevent uncontrolled sale of the goods 4 and 6 on a grey market to the advantage of the agents 8.

The goods system 1 provides the customers with the advantage that, in contrast to a conventional online trade, they can inspect the products in advance. The customers themselves can decide whether they buy the goods 4 and 6 directly online or on site from the agent 8. For finding the agents 8 it is possible that the customers make use of a locating service via their smart phones. The customers 12 further are directly connected to the branded company 2 via their smartphones enabling them to obtain additional and immediate information about the goods and the enterprise by the same.

Figure 2A:
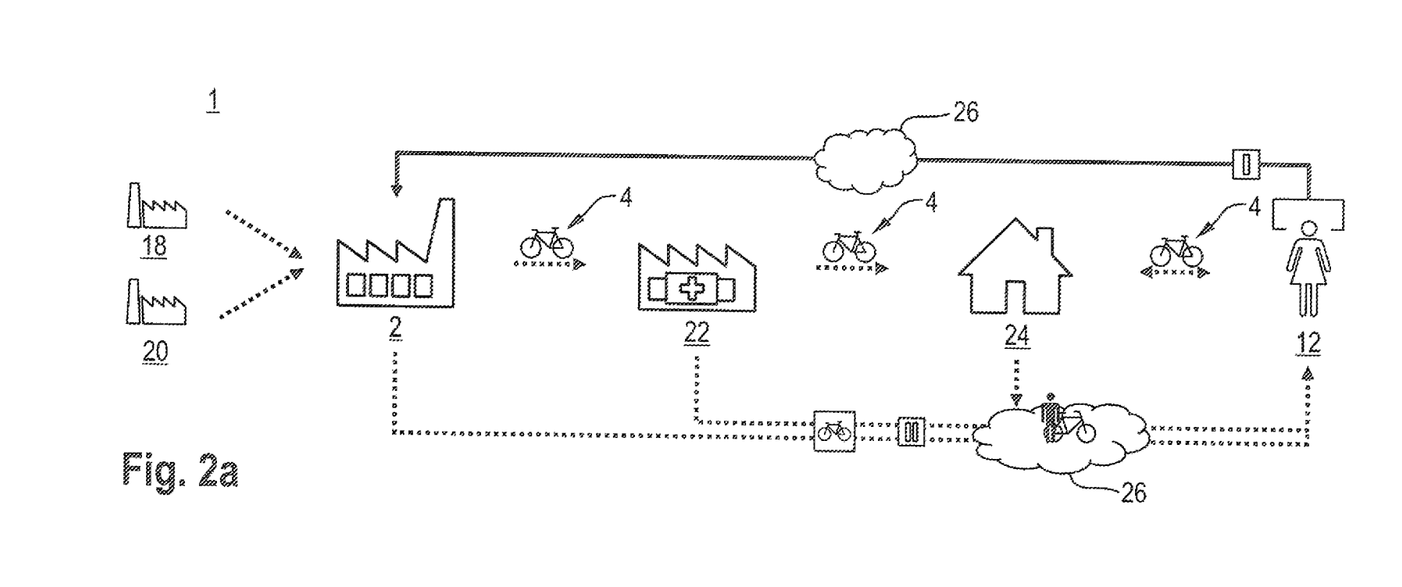
FIGS. 2a and 2b schematically show the goods system according to another embodiment, FIG. 3 schematically shows the goods system according to another embodiment, FIG. 4 schematically shows the goods system according to another embodiment, FIG. 5 schematically shows the goods system according to another embodiment and FIG. 6 schematically shows a goods system and a circulation system according to another embodiment.

FIG. 2a illustrates another form of a goods system 1. The branded company 2 receives components for the product bicycle 4 from suppliers 18, 20. The product 4 individualized by the code is then transported from the branded company 2 to a national partner 22. For example, for each country one national or several national partners can be provided. The national partner 22 preferably does not buy out the goods or the bicycles 4, but merely serves as distributor of the goods 4. It usually has profound market knowledge in its region and thus can completely concentrate on the distribution of the goods 4 without investing in accounting, for example. The national partner 22 then distributes the goods or bicycles 4 to local partners 24. These are common bicycle retailers, for instance. The national partner 22 can supply the goods 4 to a plurality of local partners 24. The customer 12 now can acquire the goods 4 from the local partner 24 on site or finds the individualized goods 4 on the Internet (cloud) 26. The customer 12 can then acquire the individualized goods on the Internet 26 either from the branded company 2, from the national partner 22 or from the local partner 24. In all cases payment is equally effected via Internet 26 directly to the branded company 2. Alternatively, payment can also be made in cash "on site", wherein the payment operation has been transacted and confirmed in advance via the Internet.

Figure 2B:
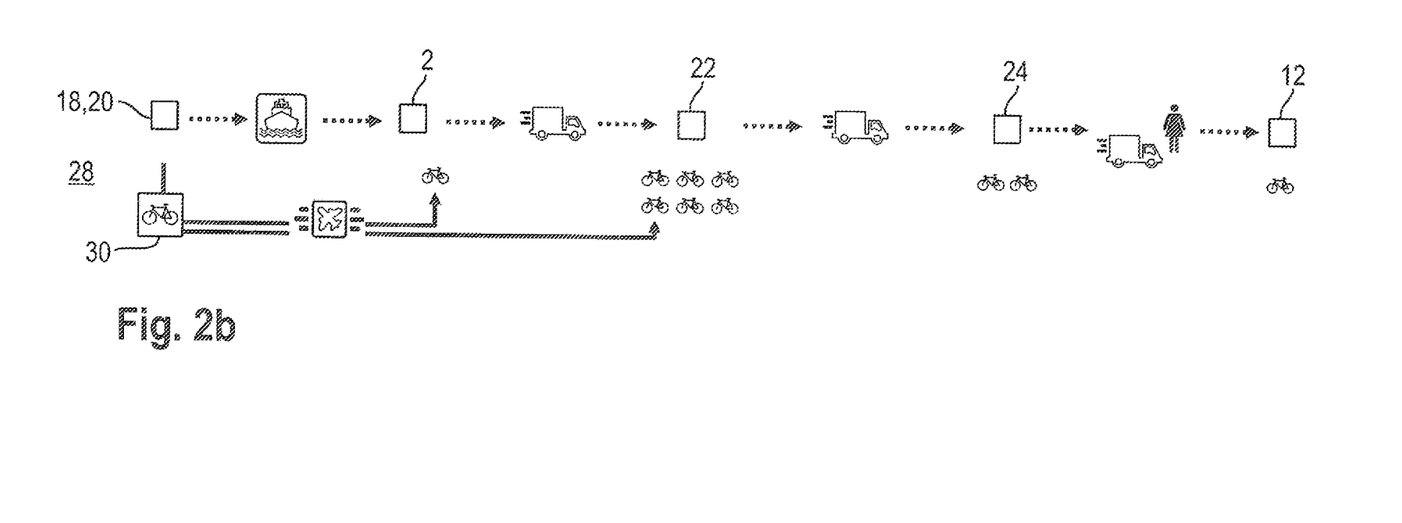

In accordance with FIG. 2b, a common logistics chain 28 for the goods system 1 of FIG. 2a is shown. The goods 4 are transported from the supplier 18, 20 to the branded company 2. From there they are transported to the national partners 22 which in turn distribute the goods to the local partners 24. The final member then is formed by the customer 12. In addition, emergency kits 30 can be supplied on demand to the branded company 2 or the national partner 22, for example via air transportation. By the goods system 1 all storage locations of the goods 4 from FIG. 2a are known to the branded company 2.

The local partner 24 according to FIG. 2a preferably is revenue-dependent. It obtains the individualized goods 4 from the branded company 2 as product option. It has to pay for a particular product 4 especially the manufacturing costs, the customs fees, the transportation fees and the turnover tax. If then a customer 12 purchases the product 4 from the local partner 24, the latter receives from the branded company 2 the costs for the product option and additionally a share in potential revenue. The national partner 22 equally receives a share in the revenue of the product 4 just as the branded company 2. The revenue of the product 4 is thus spit to the branded company 2, the national partner 22 and the local partner 24. Possible discounts can be split between the branded company 2 and/or the local partner 24 and/or the national partner 22.

Figure 3:
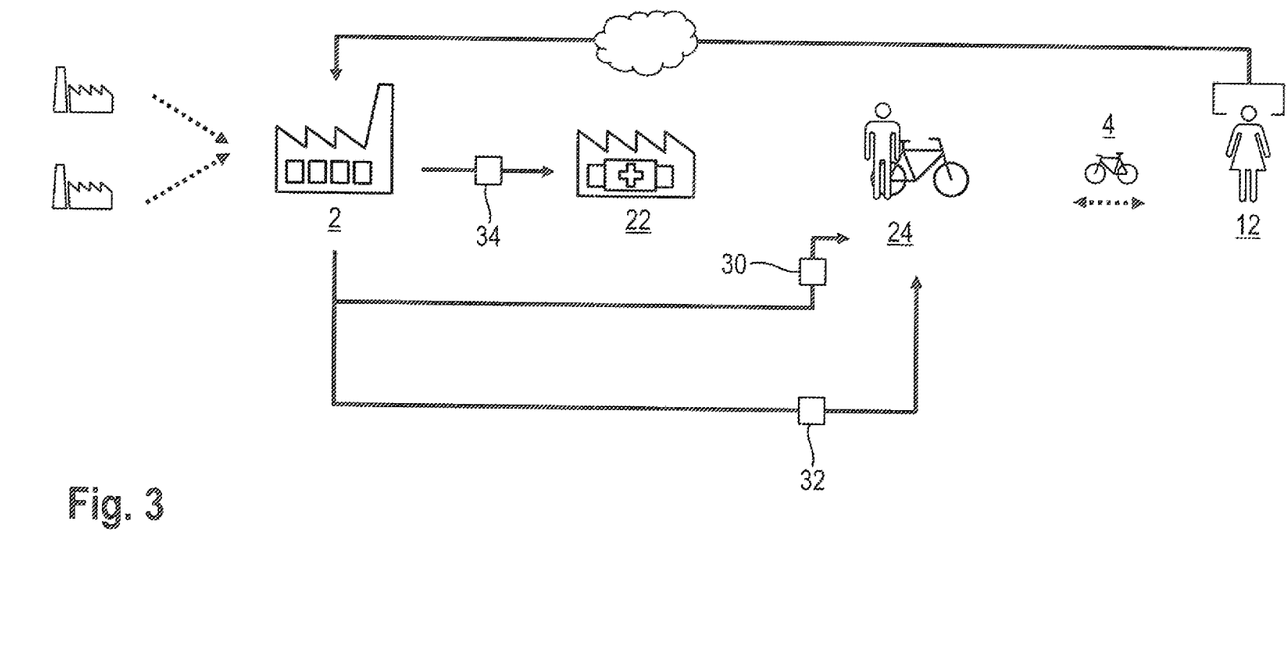

According to FIG. 3, alternatively or additionally to the revenue-dependent partner a commission-dependent partner 24 can be provided as local partner 24. The commission-dependent partner buys the goods 4 from the branded company 2, for example, which is marked by reference numeral 30. The goods 4 are delivered from the national partner 22. The purchase price upon purchase 30 of the goods 4 then is reduced for the commission-dependent local partner 24 e.g. by 30% compared to the sales price of the goods 4. Alternatively, the latter can also deposit a security for the goods 4. If the goods 4 are then sold to the customer 12, the local partner 24 receives a sales commission 32. In accordance with FIGS. 2a and 2b, the national partner 22 receives a share in the revenue, which is marked by reference numeral 34 in FIG. 3.

Figure 4:
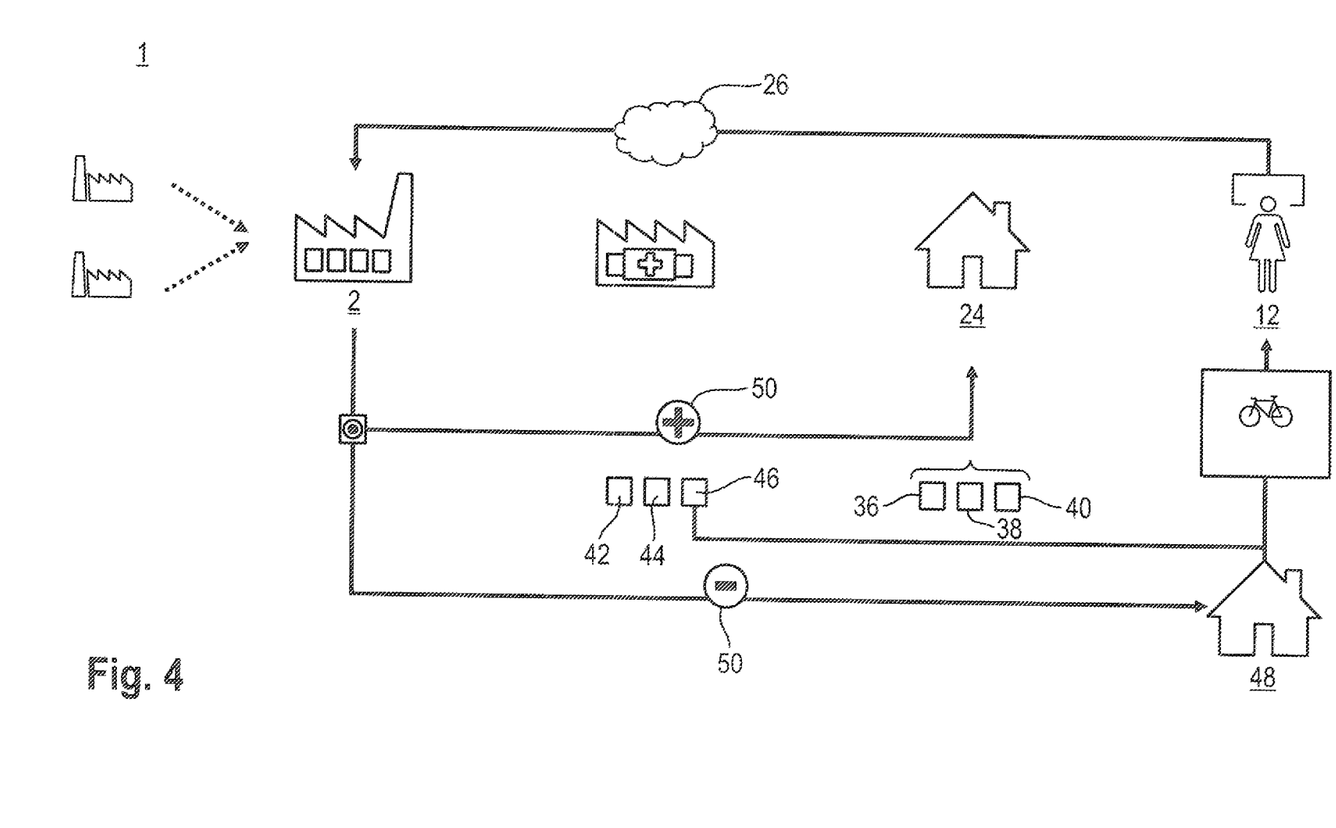

According to FIG. 4, another possible embodiment of the goods system 1 is shown. It is provided in this case that a local partner 24 acquires six product options 36 to 46. By the networking of all local partners, national partners and the branded company 2 via the Internet 26 it is not mandatory for the customers 12 to acquire the individualized goods related to the product options 36 to 46 via the local partner 24, but they can also find them on the Internet 26, for example. Moreover, the customers 12 have the option to go to another local partner 48 which can also sell the goods and/or the product options 36 to 46 of the local partner 24. If the former sells e.g. the goods or product options 42 to 46, it preferably receives from the branded company 2 a share in the revenue or a commission less a particular interest rate 50, as the other local partner 24 is the owner of the product options 42 to 46. The other partner 24 then advantageously receives the interest rate 50 along with the costs for the product options 42 to 46.

Figure 5:
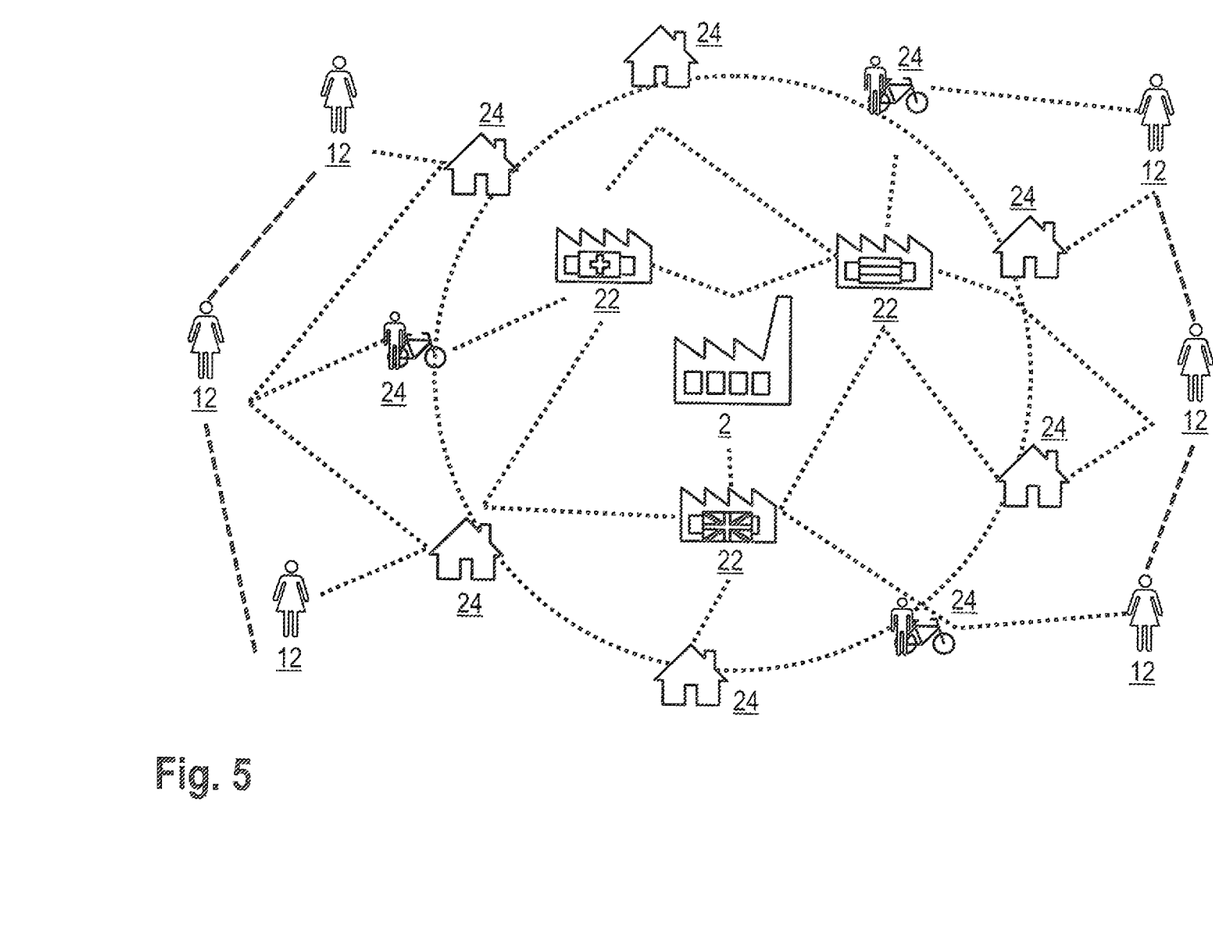

FIG. 5 represents the advantageous networking of the branded company 2 with its national partners 22 and local partners 24. Based on the Internet, the customer 12 can access all distribution partners of the branded company 2. The branded company 2 is informed about the location of the goods at the partners 22 and 24 and can control the price of the goods in line with the market.

Figure 6:
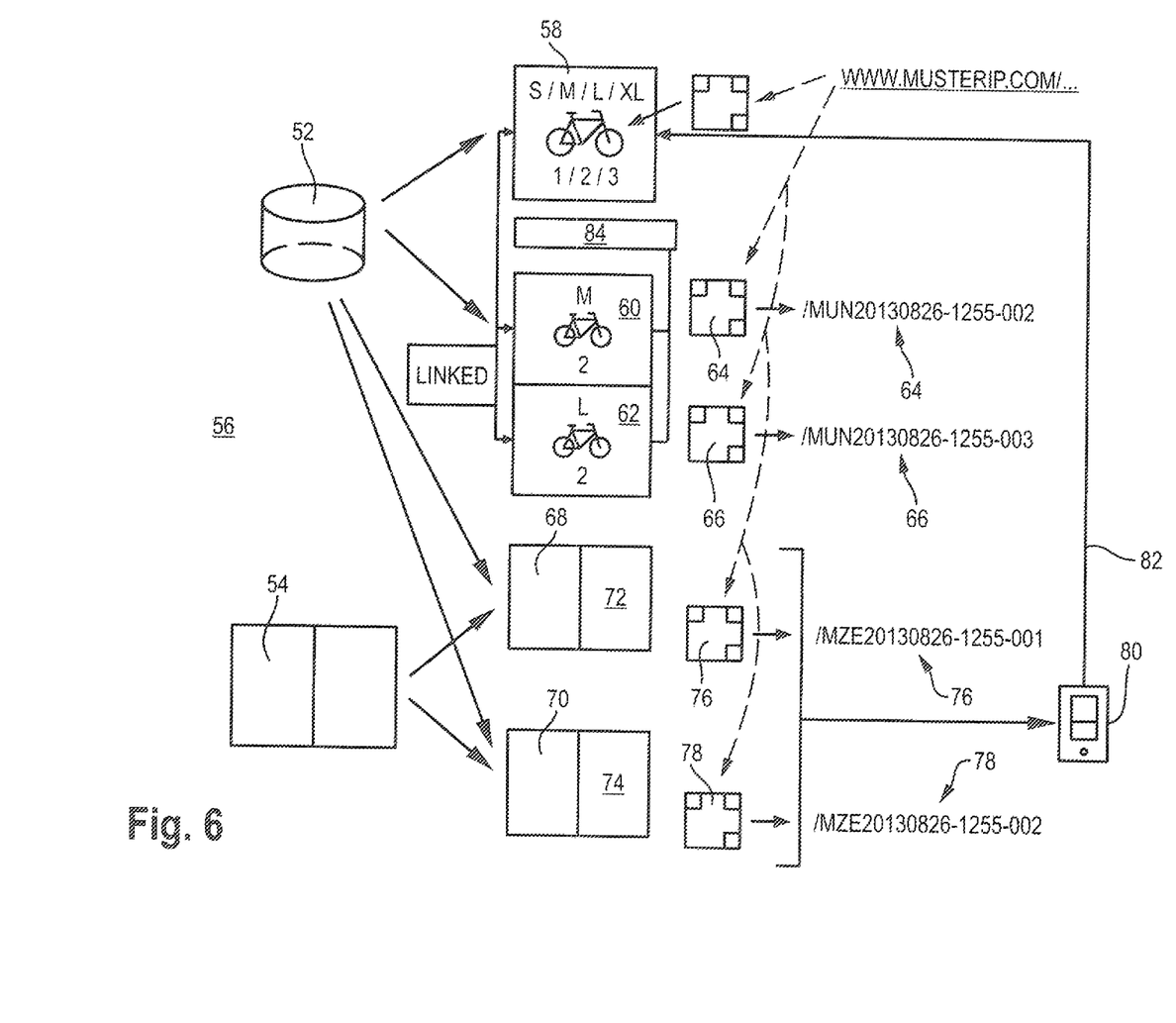

FIG. 6 illustrates a goods system 52 and a circulation system 54 which can be linked to form a distribution system 56. According to FIG. 6, the goods system 52 has a website 58 by which the goods of the goods system 52 can be accessed. Further, two products 60 and 62 having different configurations and individual codes 64 and 66, resp., are shown. The individual code 64 and 66, resp., has the following form: www.Musterip.com/MUN20130826-1255-002 or-003. Thus at the beginning it has an IP address which may be the website of the branded company or a superordinate website, such as of a brand cloud operator (www.brandcloud.com). The three-digit abbreviation (MUN) listed behind the IP address is e.g. an abbreviation of the manufacturer producing the goods or of the branded company (MUN). This is followed by date and time preferably indicative of the time when the product is individualized by the code. This in turn is followed by a consecutive number.

The circulation system 54 (for example a daily newspaper) by way of example has first and second copies or, resp., units 68 and 70 according to FIG. 6. A respective unit 68 and 70 includes a page 72 and 74, resp., each including an individual code or circulation code 76 and 78, respectively. A respective code 76, 78 may contain information, for instance, about the unit which is concerned and about the circulation system from which the same originates. Moreover, the information provided can be a manufacturing date of the unit, a time and/or a page number etc. The respective code 76 and, resp., 78 can generally be structured corresponding to the codes 64 and, resp., 66 of the goods system 52. The three-digit abbreviation used can be an abbreviation of the daily paper (MZE=Musterzeitung[1]). As IP address the address of the circulation system 54 (for instance of the daily paper) might be used, wherein upon recalling the IP address forwarding to the IP address of the goods system 52 takes place. Alternatively, the IP address of the goods system 52 can be provided.

The respective code 76 and/or 78 then can be depicted on page 72 or 74 with a representation or advertisement of a product. If the code 76 and/or 78 is scanned by a web-enabled device 80, for example by a reader of the unit or a person interested in the promoted product, the scanned code 76 and/or 78 can lead to the website 58 of the goods system 52 via a link 82, wherein the website 58 then can be displayed on the device 80. The website 58 can generally represent e.g. the product sought-after. If the reader then selects a particular configuration 84 of the product, he/she arrives, for example, at the product 62 including the individualized code 64. Then he/she can purchase the latter, with the circulation code 76 and/or 78 being taken into account and e.g. results in the fact that the reader is granted discount for the product. The circulation code 76 and/or 78 then is "devaluated" and cannot be used again by a different reader, thus providing an inducement to newly buy a copy of the circulation system.

By the goods system and, respectively, the method for a goods system according to the invention the advantages of conventional local trade, conventional online trade and a direct distribution brand are combined. The local advice helps to reduce bad buys and to build up regular customers. A local service can be offered. The goods system is highly efficient, as transactions, accounting, marketing, purchase, information technology, assortment and/or market research are handled substantially centrally by the branded company. Furthermore, the drawbacks of conventional online trade such as price loss and a lack of inspection of the goods on site by the customer are avoided.

There is disclosed, in particular according to the invention, a goods system comprising goods, wherein each particular product includes an individual code. The latter is deposited in a database and is linked with information, especially sales-relevant information. The code of the product is configured so that it can be scanned via a scanner of a web-enabled device, especially a smart phone. The information linked with the code in the database then can be displayed on the device. Furthermore, the product provided with the code can be purchased via the code by the device.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A method for a goods system comprising the steps of:
   receive a request at an inventory management system, implemented on a branded company computer, for a branded company good, the request having been transmitted from a retailor application implemented by a retailor computer based on a display of a sample good, the request including a retail location;
     generate a database record for an instance of the branded company good, the database record stored in a branded company computer and including
       sales-relevant information and
       a unique identifier code that is specific to the instance of the branded company good;
   ship the instance of the branded company good having the unique identifier code to the retail location;
   receive a scan, made through the retailor application on the retailor computer, of the displayed unique identifier code, at the inventory management system;
   transmit the sales-relevant information associated with the scanned unique identifier code for display by the retailor application on the retailor computer;
   receive a purchase agreement and a payment for the instance of the branded company good including the price paid for the instance of the good; and
   update the database for the instance of the branded company good to include the price paid for the instance of the good and to indicate that the particular instance of the branded company good was sold.

2. The method according to claim 1, wherein after receiving the scan of the displayed unique identifier code the goods system compares the scanned unique identifier code to the unique identifier codes stored in the database records of the branded company.

3. The method according to claim 1, wherein a price of the instance of the branded company good can be dynamically adapted by the branded company by making changes to the sales-relevant information stored in the database record for the instance of the branded company good.

4. The method according to claim 1, wherein, in the database record for an instance of a branded company good, a commissioning model or revenue model is deposited for the agent holding the goods having the particular scanned code.

5. The method according to claim 1, wherein the retail location can be updated using the retailor application whereupon the change of the retail location for the instance of the branded company good is recorded in the database record for that branded company good.

6. The method according to claim 1, wherein the price paid for the instance of the branded company good is greater than the payment for the instance of the good.

7. The method according to claim 1, wherein a particularly modified standard online shop system is used as the retailor application.

8. The method according to claim 1, wherein the purchaser receives individual advice via Internet or telephone concerning the instance of the branded company good identified by the scanned unique identifier code.

9. The method according to claim 1, wherein the branded company is the owner of the instance of the branded company good until purchase by the purchaser.

10. A goods system comprising
    one or more sample goods displayed at a retail location associated with a retailor entity, each sample good associated with a plurality of instances of the good, each instance of the good having an individual code specific to that instance;
    a retailor application adapted to scan, using a scanner of a web-enabled device running the retailor application, to receive an indication of the sample good and a selection of an instance of the good including the code of an instance of the good,
    a sales processing location associated with the enterprise of an origin entity at a corporate location including a database that includes a record for each individual code and associated sales-relevant information associated with the instance of a good associated with that individual code, wherein the database is accessible via the Internet by the web-enabled device,
    wherein upon access to the database by the web-enabled device at least the sales-relevant information of the instance of a good including the individual code is transmitted to the web-enabled device via the Internet,
    wherein the instance of a good including the individual code is purchased via the web-enabled device,
    wherein the purchase location is associated with a retailor entity and the corporate location is associated with the origin entity and the origin entity retains ownership of the instance of the good prior to the purchase.

11. The goods system according to claim 10, wherein the web-enabled device can access the database via the Internet so as to display instances of a good dependent on their location.

* * * * *